United States Patent
Haider et al.

(10) Patent No.: US 7,787,560 B2
(45) Date of Patent: Aug. 31, 2010

(54) SMART ANTENNA INTERFACE USING ONLY DIGITAL I/O SUPPORTING BOTH MODE A AND MODE B ANTENNA OPERATION AS PER CEA 909 STANDARD USING A SINGLE DIGITAL COUNTER

(75) Inventors: Towfique Haider, Allen, TX (US); Kazunobu Shin, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 544 days.

(21) Appl. No.: 11/931,518

(22) Filed: Oct. 31, 2007

(65) Prior Publication Data

US 2008/0101517 A1 May 1, 2008

Related U.S. Application Data

(60) Provisional application No. 60/863,589, filed on Oct. 31, 2006.

(51) Int. Cl.
*H04L 27/00* (2006.01)

(52) U.S. Cl. .................................. 375/295; 375/259
(58) Field of Classification Search ............... 375/219, 375/259, 295
See application file for complete search history.

(56) References Cited

U.S. PATENT DOCUMENTS

| 7,477,326 B2 * | 1/2009 | Jaffe | 348/726 |
| 2004/0203347 A1 * | 10/2004 | Nguyen | 455/13.3 |

* cited by examiner

*Primary Examiner*—David B Lugo
(74) *Attorney, Agent, or Firm*—Robert D. Marshall, Jr.; W. James Brady; Frederick J. Telecky, Jr.

(57) ABSTRACT

This invention samples and transmits the CEA-909 standard smart antenna analog pulse train waveforms using only a digital I/O pin for both mode A and mode B operation. This invention implements the smart antenna interface based on a single digital programmable counter. This counter is programmable so that it can tolerate or produce wide variation of symbol width.

7 Claims, 5 Drawing Sheets

| BIT | 7 | 6 | 5 | 4 | 3 | 2 | 1 | 0 |
|---|---|---|---|---|---|---|---|---|
| MNEMONIC | RES | RES | RXERR | MODE | TXSTART | TXRXSEL | TXDINV | PINSEL |
| TYPE | R | R/W | R/W | R/W | R/W | R/W | R/W | R/W |
| DEFAULT | 0 | 0 | 0 | 0 | 0 | 0 | 0 | 0 |

*FIG. 7*

| BIT | 7 | 6 | 5 | 4 | 3 | 2 | 1 | 0 |
|---|---|---|---|---|---|---|---|---|
| MNEMONIC | TD7 | TD6 | TD5 | TD4 | TD3 | TD2 | TD1 | TD0 |
| TYPE | R/R | R/W | R/W | R/W | R/W | R/W | R/W | R/W |
| DEFAULT | 0 | 0 | 0 | 0 | 0 | 0 | 0 | 0 |

*FIG. 8*

| BIT | 7 | 6 | 5 | 4 | 3 | 2 | 1 | 0 |
|---|---|---|---|---|---|---|---|---|
| MNEMONIC | RES | RES | TD13 | TD12 | TD11 | TD10 | TD9 | TD8 |
| TYPE | R | R | R/W | R/W | R/W | R/W | R/W | R/W |
| DEFAULT | 0 | 0 | 0 | 0 | 0 | 0 | 0 | 0 |

*FIG. 9*

| BIT | 7 | 6 | 5 | 4 | 3 | 2 | 1 | 0 |
|---|---|---|---|---|---|---|---|---|
| MNEMONIC | RXD7 | RXD6 | RXD5 | RXD4 | RXD3 | RXD2 | RXD1 | RXD0 |
| TYPE | R/W | R/W | R/W | R/W | R/W | R/W | R/W | R/W |
| DEFAULT | 0 | 0 | 0 | 0 | 0 | 0 | 0 | 0 |

*FIG. 10*

| BIT | 7 | 6 | 5 | 4 | 3 | 2 | 1 | 0 |
|---|---|---|---|---|---|---|---|---|
| MNEMONIC | RES | RES | RES | RES | RES | RES | RXD9 | RXD8 |
| TYPE | R | R | R | R | R | R | R/W | R/W |
| DEFAULT | 0 | 0 | 0 | 0 | 0 | 0 | 0 | 0 |

*FIG. 11*

SMART ANTENNA INTERFACE USING ONLY DIGITAL I/O SUPPORTING BOTH MODE A AND MODE B ANTENNA OPERATION AS PER CEA 909 STANDARD USING A SINGLE DIGITAL COUNTER

CLAIM OF PRIORITY

This application claims priority under 35 U.S.C. 119(e)(1) to U.S. Provisional Application No. 60/863,589 filed Oct. 31, 2006.

TECHNICAL FIELD OF THE INVENTION

The technical field of this invention is transmitting and receiving data with smart antennas.

BACKGROUND OF THE INVENTION

This invention samples and transmits the CEA-909 standard smart antenna analog pulse train waveforms using only a digital I/O pin for both mode A and mode B operation. This invention implements the smart antenna interface based on a single digital programmable counter. This counter is programmable so that it can tolerate or produce wide variation of symbol width.

This invention receives any hexadecimal or decimal format antenna programming code via a digital pin and generates a train of symbol sequence according to CEA-909 mode A operation standard. A programmable digital counter enables adjustment of the symbol width duration according to customer or antenna requirement.

This invention samples the incoming symbol for Mode B operation according to the CEA-909 standard through a digital input pin. This sampling uses the same digital counter as used in mode A operation. This counter is programmable to handle wide variation in incoming symbol width. After receiving the complete packet of symbols this interface translates it to hexadecimal format for easy user comprehension.

This invention is an all digital smart antenna interface. This invention uses only a digital input and an output pin. The same hardware is used for both Mode A antenna operation and Mode B antenna operation. Because this invention uses a single digital counter, it requires an insignificant digital chip area for the implementation. This invention requires only a few digital flip-flops and logic gates.

SUMMARY OF THE INVENTION

This invention uses a programmable digital counter to generate the analog symbol according to the CEA 909 standard for the smart antenna from a decimal or hexadecimal number provided by the user. This invention uses the same counter to receive symbols with wide tolerance back from the antenna and translate the symbol into decimal or hexadecimal number to be transmitted back to the user.

BRIEF DESCRIPTION OF THE DRAWINGS

These and other aspects of this invention are illustrated in the drawings, in which:

FIGS. 7 to 11 illustrate the configuration of data registers used in the preferred embodiment of this invention.

DETAILED DESCRIPTION OF PREFERRED EMBODIMENTS

This invention involves the integration of a controller for a CEA 909 standard smart antenna into a digital television (DTV) front end system-on-chip (SOC) integrated circuit. This antenna controller operates in both antenna mode A or mode B of the standard. This invention handles both incoming and outgoing antenna transmission by one programmable digital counter and digital I/O. This invention also translates the symbol to decimal or hexadecimal format for the user. This invention provides a very compact implementation including efficient hardware reuse.

Figure 1:
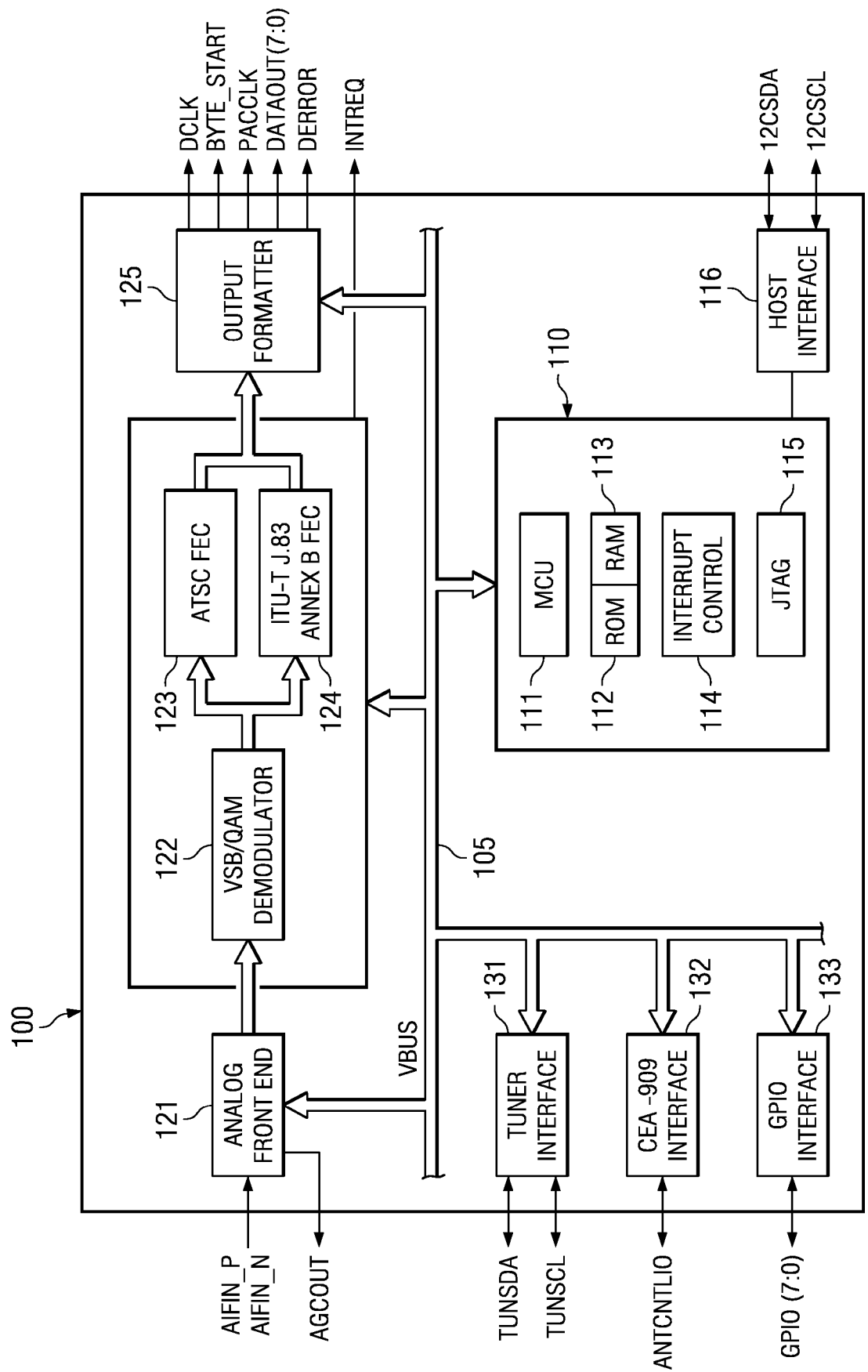
FIG. 1 illustrates a block diagram of front end circuit of this invention.

FIG. 1 illustrates a block diagram of front end circuit SOC 100 of this invention. Front end circuit 100 includes controller 110 including: microprocessor control unit (MCU) 111; read only memory (ROM) 112; random access memory (RAM) 113; interrupt controller 114; and JTAG interface 115. Controller 110 interfaces with other parts of front end circuit 100 via VBus 105. Controller 110 communicates with a host processor controlling overall operation of the digital television via host interface 116. This host interface 116 exchanges signals via two I$^2$C lines. The line I$^2$CSDA carries data and the line I$^2$CSCL carries the clock. Controller 110 communicates with other circuits on front end circuit 100 via Vbus 105.

FIG. 1 illustrates the signal path of the DTV. Analog front end (AFE) 121 receives an intermediate frequency (IF) signal from a radio frequency tuner (not illustrated in FIG. 1, see FIG. 2) via differential lines AIFIN_P and AIFIN_N. Analog front end 121 transmits an automatic gain control (AGC) signal back to the tuner via line AGCOUT. Analog front end 121 preferably includes a 10 bit analog to digital converter (ADC) which produces a digital signal transmitted to VBS/QAM demodulator 122. VBS/QAM demodulator 122 demodulates the received signal according to either the 8-VSB demodulation compliant with ATSC for digital over the air broadcasts or the 64/256 QAM demodulation compliant with ITU-T J83 Annex B for digital cablecasts. VSB/QAM demodulator 122 preferably includes adjacent channel filtering, NTSC (analog broadcast) rejection filter and other processes necessary to recover the signal for viewing. Depending on the use, front end circuit 100 employs either ATSC forward error correction (FEC) for digital over the air broadcasts or ITU-T J83 Annex B FEC for digital cable casts. FEC involves one-way error correction with the transmitter sending redundant data enabling error detection and recovery. These FEC blocks 123 and 124 detect and correct any errors in the received signal from the transmitted data. As known in the art, such forward error correction typically includes trellis decoding, synchronizing, de-interleaving, Reed Solomon decoding and de-randomizing.

The error corrected data is supplied to output formatter 125. Output formatter 125 generates a MPEG-2 transport stream compliance with ISO/IEC 13818-1 to supply a back end circuit (not shown in FIG. 1, see FIG. 2). Output formatter 125 produces the following signals listed in Table 1.

TABLE 1

| | |
|---|---|
| DCLK | MPEG-2 data clock output |
| BYTE_START | MPEG-2 start byte signal. An active high output signal that indicates the first byte of a transport stream data packet. |
| PACCLK | MPEG-2 interface packet framing signal. An active high output signal remains high for the duration of a valid data packet. |
| DATAOUT[7:0] | MPEG-2 data. This is preferably available both as serial and parallel data. |
| DERROR | MPEG-2 interface data error signal. This is active high upon an error in the input data. |

The polarity of DCLK, BYTE_START, DERROR and PACCLK are preferably programmable.

Figure 2:
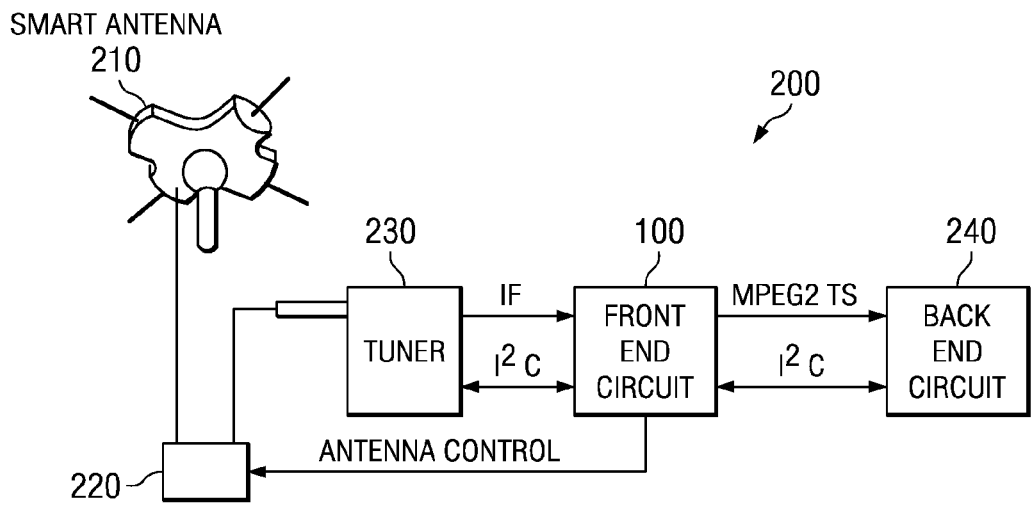
FIG. 2 illustrates a block diagram of a digital television such would use this invention.

Tuner interface 131 communicates with an external radio frequency tuner (not illustrated in FIG. 1, see FIG. 2). Tuner interface 131 exchanges signals via two I²C lines. The line TUNSDA carries data and the line TUNSCL carries the clock. This tuner interface 131 isolates the external tuner from the host processor. To transfer data between the host processor and the tuner, the host processor first writes the transaction to a set of registers in front end circuit 100 via host processor I²C lines and host interface 116. Controller 110 then transfers the data to/from the tuner via tuner control interface 131.

GPIO interface 133 is a general purpose input/output interface. It exchanges signals via lines GPIP[7:0]. Two of these connections have special functions is mode B as will be explained below.

CEA-909 interface 132 exchanges signals with an external antenna controller (not illustrated in FIG. 1, see FIG. 2). The antenna control will be further described below.

Front end circuit 100 is preferably used in a digital television such as digital television 200 illustrated in FIG. 2. Smart antenna 210 receives the radio frequency broadcast signals. Smart antenna 210 is controlled by antenna controller 220. This antenna and controller combination allows a wide variety of antennas to be used. The CEA-909 standard interface provides signals to control antenna direction, antenna polarization, pre-amplifier gain and channel number. Smart antenna 210 could be a high-gain, roof mounted antenna having rotor control for pointing direction. Smart antenna 210 could be a set of smaller dipole elements with differing orientation switched in based upon the pointing direction. The channel number permits the antenna and antenna controller combination to include channel filtering or selection of one of a set of television band amplifiers or filters. The pre-amplifier gain control enables the antenna supplied RF signal to be balanced among the received channels despite differences in received signal strength.

Antenna controller 220 supplies a received RF signal to tuner 230. Antenna controller 22 receives control signals from front end circuit 100.

Tuner 230 is controlled by channel to supply a signal on a fixed intermediate frequency (IF) to front end circuit 100. As previously described this signal is supplied to analog front end 121. Tuner 230 receives control signals on the previously described I²C lines from front end circuit 100 via tuner interface 131.

Front end circuit 100 supplies a MPEG-2 transport stream to back end circuit 240. Back end circuit 240 preferably includes all digital circuitry for decompression and formatting for an attached display (not shown). Back end circuit 240 preferably also includes the host processor which communicates with front end circuit 100 via I²S lines I²CSDA and I²CSCL and host interface 116 previously described.

Figure 3:
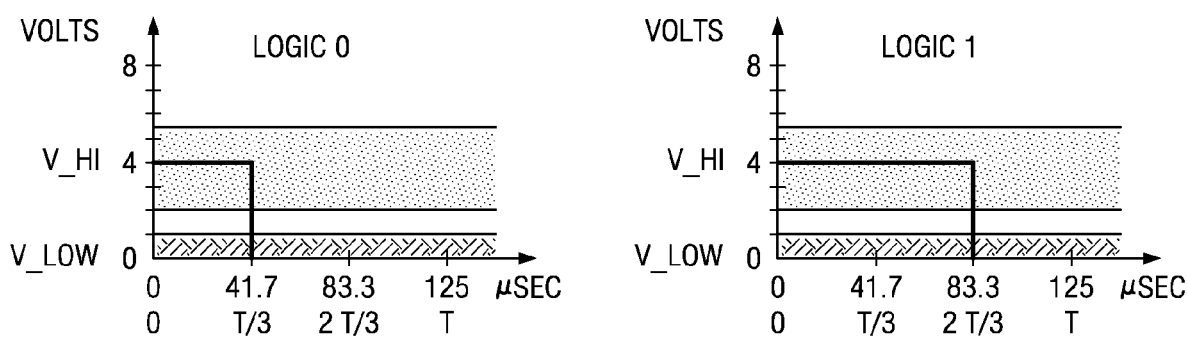
FIG. 3 illustrates the standards for transmission of symbols of "0" and "1" in the CEA-909 standard (prior art)

FIG. 3 illustrates the standards for transmission of symbols of "0" and "1" in the CEA-909 standard. The voltage V_hi is nominally 4 volts but is permitted to vary from 1 to 5.5 volts. The voltage V_low is nominally 0 volts but may be up to 1 volt. A "0" or a "1" is transmitted within the same 125 μsec window. Each interval of 125 μsec is one symbol period T. A "0" symbol has a pulse duration of 41.7 μsec ±5% measured at the 50% voltage point (⅓ T). A "1" symbol has a pulse duration of 83.3 μsec ±5% measured at the 50% voltage point (⅔ T). The rise and fall times must be between 4 μsec and 8 μsec. This results in a data transmission rate of 8 kHz. The antenna controller shall provide a 2,200 ohm ±10% load on the logic line to ground. Detecting the resulting current flow enables the television to determine that an antenna using the interface is connected.

Figure 4:
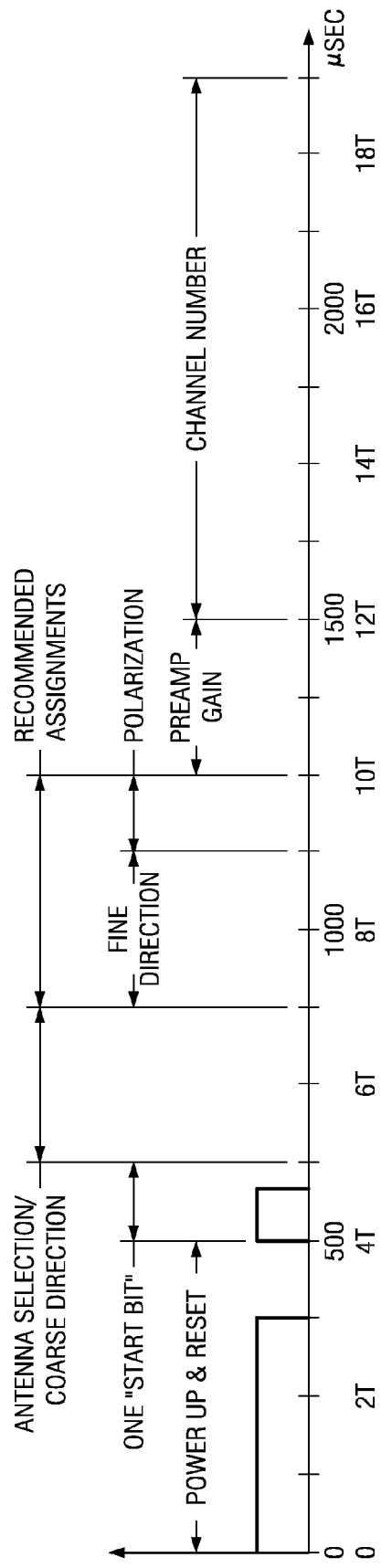
FIG. 4 illustrates a typical data transfer to the antenna controller to configure the antenna for a changed channel (prior art)

FIG. 4 illustrates a typical data transfer from front end circuit 100 to antenna controller 220 such as to configure the antenna for a changed channel. The logic line is initially set at V_low. During initial interval 401, line is driven to V_hi for three symbol periods (3T) or 375 μsec, then driven to V_low for one symbol period (T) or 125 μsec. Interval 402 includes a single start bit "1". Intervals 403 to 406 transmit the actual data. Interval 403 is two bits specifying the course direction bits. Interval 404 is three bits including two bits specifying the fine direction and on bit specifying polarization. The 4 bits of direction control the optimum receive direction of the smart antenna. The 1 bit of polarization control selects between horizontal and vertical polarization. Interval 405 is two bits controlling the pre-amplifier gain. The gain goes from [0,0] as the least gain to [1,1] as the most gain. Interval 405 is 7 bits specifying the channel number. The line must then return to V_low and remain until the next RF channel change. The standard mandates at 10 msec interval between data streams to allow for the antenna controller logic to reset.

The CEA-909 smart antenna standard defines two types of antennas mode A and mode B. Mode A antennas do not transmit signals back to the controller. Mode B antennas may both receive data from their controller and transmit data to their controller. The receiver and antenna controller engage in the handshaking sequence to establish whether to use Mode A or Mode B operation. The television preferably uses this handshaking sequence upon initial powering. The television sends an interrogation to the antenna controller. This interrogation is a transmission as illustrated in FIG. 4 with an RF channel number of zero. The television then tri-states the line and waits 100 msec for a reply from the antenna controller. If there is no response, the television may assume mode A operation. If the antenna responds with a message, then the antenna controller shall be assumed to be a mode B system and the television shall respond by using mode B control functions. This initialization is optional. If the television receiver has only Mode A enabled, then it may omit this initialization step.

A mode B-capable antenna controller will reply to the television receiver initialization signal with a mode B program identifier. The reply format uses the same symbol rate as the initialization. The message length is 10 bits corresponding to a number assigned for that mode B program. The antenna shall start a 100 msec timeout for acknowledgement from the television receiver. If the receiver understands the mode B program identifier, the receiver shall reply with a basic mode A serial data stream as illustrated in FIG. 4 with an RF channel number of one. This acknowledges mode B operation. The program corresponding to the mode B program identifier shall proceed from this point. If the television receiver fails to acknowledge within the timeout period or the antenna receives no initialization message, the antenna shall revert to mode A operation. All mode B capable antennas should have default capability in mode A.

Front end circuit 100 may use one or two of the general input/output pins in mode B operation. In a 1-pin mode, the data input and output between are multiplexed on the ANTCNTLIO pin. In a 2-pin mode the input is received on one of the general purpose input/output pins GPIO[0] and output uses the ANTCNTLIO pin. In the 1-pin mode the direction data transmission is indicated on another general purpose input/output pin GPIO[1]. A "0" indicates receiving data from the smart antenna and "1" indicates transmitting data to the smart antenna. As will be described below, the PENSEL bit of the Control and Status Register.

The system including television and antenna must be initialized to select an optimum control state for each RF channel received. This may be done automatically, manually controlled by the user, or both. Further, the antenna may either use only the first 7 bits, which allow the television to control the system or it may alternatively use the second 7 bits (channel number) to access control data stored in the antenna.

The automatic programming procedure is generally an option on a television menu and executed and controlled by the television. An example of autoprogramming includes transmitting the first 7 bits in every possible combination for each RF channel received. This exhaustive search requires a total of 128 combinations. For each state, the television measures and temporarily stores a metric of the signal quality. The state giving the best quality is then stored and paired with the RF channel number.

The manual programming procedure is generally also an option of the television. On selecting manual programming, the television groups and displays the seven bits in a user friendly manner along with a signal quality indication. If the antenna controller uses the first 7 bits, the user shall then adjust each parameter and prompt the receiver to store the optimum settings. In the case where the antenna uses the RF channel number bits but ignores the first 7 bits, the antenna shall be put in an adjustment mode manually. The user determines the optimum selections of the antenna manual adjustment using the signal quality indication displayed on the receiver. These settings are then stored in the antenna's memory to be referenced by the RF channel number.

This invention samples and transmits the CEA-909 standard smart antenna analog pulse train waveforms using only a digital I/O pin for both mode A and mode B operation. This invention implements the smart antenna interface based on a single digital programmable counter. This counter is programmable so that it can tolerate or produce wide variation of symbol width.

This invention receives any hexadecimal or decimal format antenna programming code via a digital pin and generates a train of symbol sequence according to CEA-909 mode A operation standard. A programmable digital counter enables adjustment of the symbol width duration according to customer or antenna requirement.

This invention samples the incoming symbol for Mode B operation according to the CEA-909 standard through a digital input pin. This sampling uses the same digital counter as used in mode A operation. This counter is programmable to handle wide variation in incoming symbol width. After receiving the complete packet of symbols this interface translates it to hexadecimal format for easy user comprehension.

This invention is an all digital smart antenna interface. This invention uses only a digital input and an output pin. The same hardware is used for both Mode A antenna operation and Mode B antenna operation. Because this invention uses a single digital counter, it requires an insignificant digital chip area for the implementation. This invention requires only a few digital flip-flops and logic gates.

Figure 5:
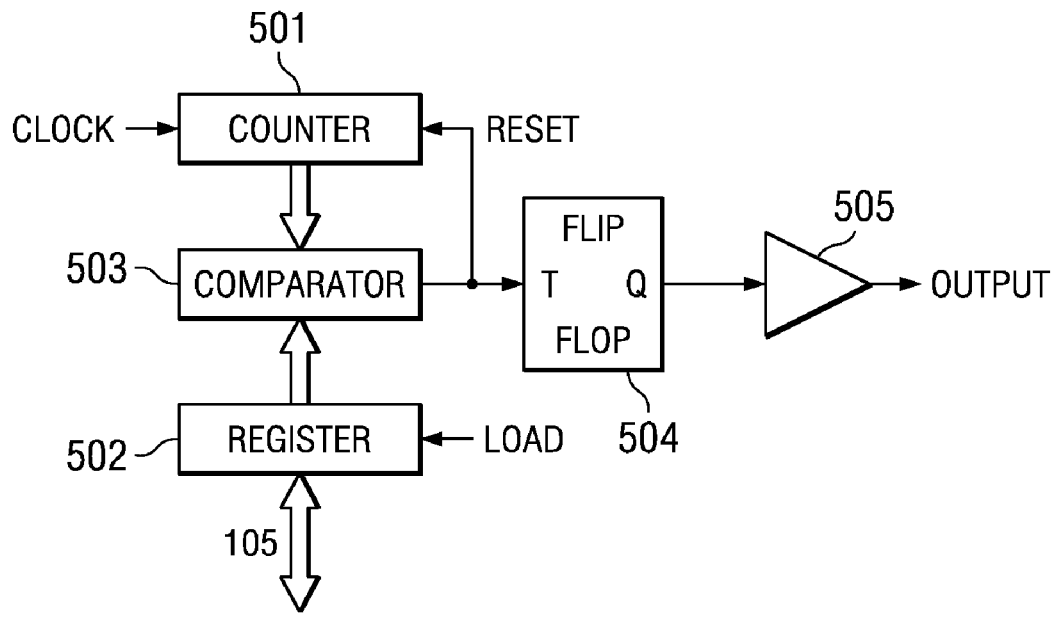
FIG. 5 illustrates the circuit arrangement for data transmission of this invention.

FIG. 5 illustrates the circuit arrangement for data transmission. Counter 501 receives and counts clock signals. Register 502 stores a value specified by microprocessor control unit 110 via Vbus 105. Comparator 503 compares the count of counter 501 with the value stored in register 502. Upon detection of a match comparator 503 triggers two actions. A match triggers a reset of counter 501. A match triggers flip-flop 504 to toggle. The output of flip-flop 504 supplies buffer 505 which drives the ANTCNTIO line to the smart antenna. Register 502 is loaded with another constant by microprocessor control unit 111 via Vbus 105.

Transmission of each bit is in two parts. Two constants are predetermined based upon the relationship between the clock frequency and the symbol period T. The first constant is about ⅓ of the number of clock cycles in the symbol period. The second constant is about ⅔ of the number of clock cycles in the symbol period. To transmit a "0", controller 110 first loads register 502 with the first constant. Upon a match in comparator 503, controller 110 loads register with the second constant. This produces a pulse corresponding to the Logic 0 illustrated in FIG. 3. To transmit a "1", controller 110 loads register 502 with the constants in reverse order. This produces a pulse corresponding to the Logic 1 illustrated in FIG. 3.

Figure 6:
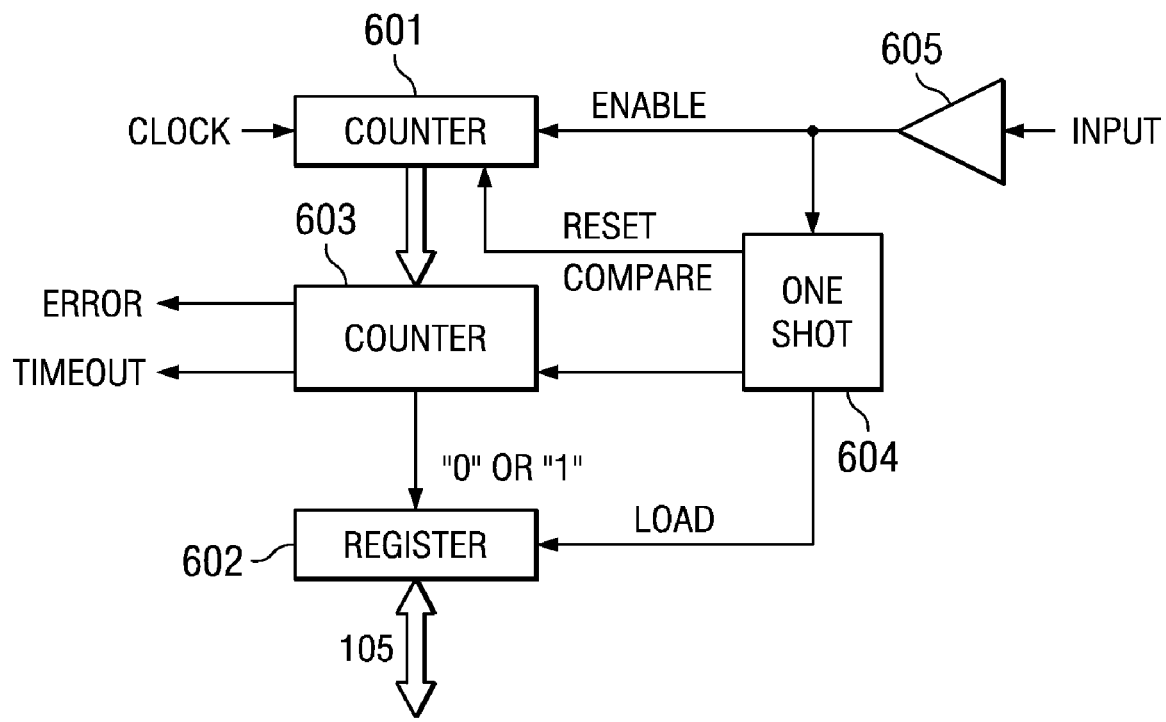
FIG. 6 illustrates the circuit arrangement for data reception of this invention.

FIG. 6 illustrates the circuit arrangement for data reception. Counter 601 counts the clock signal when enabled by the received signal via buffer 605. A high signal enables counter 601 to count. When the signal from buffer 605 transitions from a high to a low, counter 601 is disabled from counting. In addition one shot circuit 604 senses this transition and triggers comparator 603 to compare the count of counter 601 with several predetermined compare values. If the count is too small indicating a received signal transition shorter than permitted, comparator 603 generates an error signal. If no transition occurs within the permitted interval resulting in too large a count, comparator 603 generates a timeout signal. If the count is within the permitted range, comparator 603 determines if the transmitted symbol was a "0" or a "1". For example, comparator 603 may compare the count of counter 601 with a third constant about half the expected number of clock pulses during the symbol period T. If the count is less than this third constant, the transmitted bit was "0". If the count is greater than this third constant, the transmitted bit was "1". One shot 604 also triggers a load of this decoded "0" or "1" into register 602. Finally one shot 604 triggers a reset of counter 601 to prepare for the next symbol transmission. After the completion of this Mode B transmission, microprocessor control unit 111 reads the decoded values stored in register 602 via Vbus 105.

Front end circuit 100 preferably includes a number of registers within the address space of microprocessor control unit 111 used in control of communication with the smart antenna.

FIG. 7 illustrates the first of these registers preferably located at address 5Fhex called the Control and Status register. Bits 7 and 6 are reserved. Bit 5 is the RXERR bit indicating a receive data error. The RXERR bit is set to 1 by the microprocessor control unit 111 to indicate an error occurred when receiving data from a Mode B antenna. Microprocessor control unit 111 clears this bit at the beginning of the next transaction. Bit 4 is the Mode bit indicating Auto receive mode. The Mode bit is set to 1 by the host processor to enable the antenna control interface logic to automatically set-up the receive mode after a transmit data transaction. Bit 3 is the TXSTART bit signaling a transmit start. This bit is set to "1" by the host processor to start a data transmission to the smart antenna. Microprocessor control unit 111 clears this bit to "0" when the transmission completes. Bit 2 is the TXRXSEL bit. This bit is used by the host processor to select the next type of transaction to be done by the antenna control interface. In manual mode, the host processor controls this bit. In auto receive mode, the host processor sets this bit to "1" for the transmit data transaction, and the MCU sets this bit to "0" after the completion of the transmit transaction to enable the receive transaction. This TXRXSEL bit indicates "0" for a receive data transaction and "1" for a transmit data transaction. Bit 1 is the TXDINV bit. This bit indicates the transmit data polarity. The TXDINV bit is set to "1" by the host processor to invert the transmit data output. This bit is "0" for normal polarity according to the CEA-909 standard and "1" for to invert the transmit data output. Bit 0 is the PINSEL bit for Pin mode select. The pin mode select bit is used by the host processor to select the antenna control interface pin configuration. Before the 2-pin mode is selected, the GPIO0 bit must be con figured as input via bit 0 of the register at 51H. A "0" indicates selection of the two pin mode with separate input and output pins for mode B operation. A "1" indicates one pin operation in mode B.

FIG. 8 illustrates the second of these registers preferably located at address 60hex called the Transmit Data Register 1. The eight bits of the Transmit Data register 1 (TXD7 to TXD0) are the least significant 8 bits of the 14-bit data word to be transmitted to the smart antenna. The data word is set by the host processor.

FIG. 9 illustrates the third of these registers preferable located at address 61hex called the Transmit Data Register 2. Bits 7 and 6 are reserved. Bits 5 to 0 (TXD13 to TXD8) are the 6 most significant bits of the 14-bit data word to be transmitted to the smart antenna. The data word is set by the host processor.

FIG. 10 illustrates the fourth of these registers preferably located at address 62hex called the Receive Data Register 1. The eight bits of the Receive Data register 1 (RXD7 to RXD0) are the least significant 8 bits of the 10-bit data word to be received from the smart antenna in mode B operation. The data word can be read by the host processor.

FIG. 11 illustrates the fifth of these registers preferable located at address 63hex called the Transmit Data Register 2. Bits 7 to 2 are reserved. Bits 1 and 0 (RXD9 and RXD8) are the 2 most significant bits of the 10-bit data word received from the smart antenna in mode B operation. The data word can be read the host processor.

The following steps are required to transmit data to the antenna. The host processor sets the TXRXSEL bit of the Control and Status Register to select a transmit data transaction and sets MODE bit to enable auto receive. The host processor writes the required transaction data into the Transmit Data Registers 1 and 2 described above. The host processor sets the TXSTART bit to "1" to start the data transmission. In response, front end circuit 100 then transmits the contents of Transmit Data registers 1 and 2 to the antenna. The host processor checks a status register or the INTREQ pin to verify successful transmission.

After an antenna transmit transaction is executed, a Mode B antenna should respond with a 10-bit data value within 100 ms. If the receive data is not received within 100 ms, a receive timeout occurs. The following steps are required to receive data from the smart antenna. The host processor sets the TXRXSEL bit of the Control and Status Register to select a receive data transaction and sets MODE bit to enable auto receive. The host processor checks a status register or the INTREQ pin to verify successful transmission. The host processor then reads the 10-bit data value received from the smart antenna from Receive Data Registers 1 and 2. The host processor may also read the RXERR bit of the Control and Status register to determine if an error has occurred in receiving data from the smart antenna operating in Mode B antenna. If non-zero data was received and no error occurred, the data is valid and the antenna is a Mode B antenna. If the data value is zero and no error occurred, then a receive transaction did not occur and the smart antenna is assumed to be a Mode A antenna.

What is claimed is:

1. An apparatus to communicate with a smart antenna having a symbol period T comprising:
    a counter receiving a clock signal and operable to count said clock signal, said clock signal having a frequency high enough to provide plural clock pulses during each symbol period T;
    a memory mapped register storing data operable to be loaded via a memory mapped write operation;
    a comparator connected to said counter and said memory mapped register operable to generate a match signal when said count of said count equals said data stored in said memory mapped register;
    a flip-flop having a trigger input receiving said match signal of said comparator operable to toggle upon receiving said match signal and an output for transmission to the smart antenna;
    a microprocessor control unit operable to write data into said memory mapped register via a memory map write operation, said microprocessor control unit operable to:
        transmit a first digital signal by writing first constant data equal to about on third of the number of clock pulses in the symbol period T into said memory mapped register, waiting for said match signal and thereafter writing second constant data equal to about on two thirds of the number of clock pulses in the symbol period T into said memory mapped register and waiting for said match signal, and
        transmit a second digital signal opposite to said first digital signal by writing said second constant into said memory mapped register, waiting for said match signal and thereafter writing first constant data into said memory mapped register and waiting for said match signal.

2. The apparatus of claim 1, further comprising:
    a buffer having an input connected to said output of said flip-flop and an output driving the smart antenna.

3. The apparatus of claim 1, wherein:
    said counter includes an enable input receiving a signal from the smart antenna operable in a receive mode to enable counting for a first range of voltages received from said smart antenna and disable counting for a second range of voltages received from said smart counter distinct from said first range of voltages;
    a one shot circuit having an input receiving said signal from the smart antenna operable to generate a signal when said signal from the smart antenna transitions from said first voltage range to said second voltage range;
    said comparator is connected to said one shot circuit and is further operable to compare a count in said counter with at least one constant to determine the smart antenna transmitted a first digital signal or a second digital signal opposite to said first digital signal depending upon said count following generation of said signal of said one shot circuit; and said memory mapped register is further connected to said one shot circuit and is further operable to load the first digital signal or second digital signal determined by said comparator into a corresponding bit following generation of said signal by said one shot circuit.

4. The apparatus of claim 3, wherein:
said microprocessor control unit is further operable to read data from said memory mapped register via a memory map read operation.

5. The apparatus of claim 3, wherein:
said comparator is operable to determine the smart antenna transmitted the first digital signal or the second digital signal by
comparing the count of said counter with a third constant equal to about half the number of clock pulses in a symbol period T,
determining the smart antenna transmitted a first digital signal if the count is less than said third constant, and
determining the smart antenna transmitted a second digital signal opposite to said first digital signal if the count is greater than said third constant.

6. The apparatus of claim 3, wherein:
said comparator is further operable to
compare the count with a fourth constant less than the number of clock pulses in one third of the symbol period T, and
generate an error signal if the count is less than said fourth constant.

7. The apparatus of claim 3, wherein:
said comparator is further operable to
compare the count with a fifth constant greater than the number of clock pulses in one symbol period T, and
generate a timeout signal if the count is greater than said fifth constant.

* * * * *